United States Patent
Kakde et al.

(10) Patent No.: US 11,875,823 B2
(45) Date of Patent: Jan. 16, 2024

(54) HYPERMEDIA ENABLED PROCEDURES FOR INDUSTRIAL WORKFLOWS ON A VOICE DRIVEN PLATFORM

(71) Applicant: Honeywell International Inc., Morris Plains, NJ (US)

(72) Inventors: Ashwath Kakde, Bangalore (IN); Unnikrishnan Poduval, Bangalore (IN); Venkata Srinivasulu Reddy Talamanchi, Bangalore (IN); Ramesh Gadamsetty Venkata Naga, Bangalore (IN); Prasad Panambur Kamath, Bengaluru (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/841,454

(22) Filed: Apr. 6, 2020

(65) Prior Publication Data
US 2021/0312950 A1 Oct. 7, 2021

(51) Int. Cl.
*G11B 27/34* (2006.01)
*G06F 16/738* (2019.01)
*G06V 20/40* (2022.01)
*G06F 16/74* (2019.01)

(52) U.S. Cl.
CPC ............ *G11B 27/34* (2013.01); *G06F 16/738* (2019.01); *G06V 20/49* (2022.01)

(58) Field of Classification Search
USPC .................................................. 386/239–248
See application file for complete search history.

(56) References Cited

U.S. PATENT DOCUMENTS

| | | | |
|---|---|---|---|
| 6,169,573 B1 * | 1/2001 | Sampath-Kumar | H04N 21/8456 348/E7.071 |
| 6,462,754 B1 | 10/2002 | Chakraborty et al. | |
| 2006/0212897 A1 * | 9/2006 | Li | H04N 21/6125 725/32 |
| 2009/0235150 A1 * | 9/2009 | Berry | G06F 16/958 715/205 |

(Continued)

FOREIGN PATENT DOCUMENTS

EP 3318944 A2 5/2018

OTHER PUBLICATIONS

Pareti et al., "Integrating Know-How into the Linked Data Cloud", Nov. 2014, Conference: The 19th International Conference on Knowledge Engineering and Knowledge Management, 12 pages. (Year: 2014)*

(Continued)

*Primary Examiner* — Hung Q Dang
(74) *Attorney, Agent, or Firm* — Alston & Bird LLP

(57) ABSTRACT

Various embodiments described herein relate to hypermedia enabled procedures for industrial workflows on a voice driven platform. In this regard, a system compares media data related to a step of a video procedure for an industrial task with a category dictionary to determine a category for the step of the video procedure. The system also links, based on the category for the step of the video procedure, the step of the video procedure with at least a portion of a second video procedure to generate a hypervideo that comprises an industrial sub-task for the industrial task. Furthermore, the system displays the hypervideo via a head-mounted visual display of a wearable device.

19 Claims, 11 Drawing Sheets

(56) References Cited

U.S. PATENT DOCUMENTS

| | | | | |
|---|---|---|---|---|
| 2012/0017239 | A1* | 1/2012 | Ryu | H04N 21/44008 725/32 |
| 2012/0136823 | A1 | 5/2012 | Konuma et al. | |
| 2015/0153906 | A1* | 6/2015 | Liao | G06F 3/0481 715/709 |
| 2015/0339948 | A1* | 11/2015 | Wood | G02B 1/048 434/219 |
| 2016/0028895 | A1* | 1/2016 | Bell | H04L 12/18 455/416 |
| 2016/0269631 | A1 | 9/2016 | Jiang et al. | |
| 2016/0371992 | A1* | 12/2016 | Kozloski | G09B 5/02 |
| 2017/0075935 | A1* | 3/2017 | Lagos | G06N 5/022 |
| 2018/0181370 | A1 | 6/2018 | Parkinson | |
| 2019/0186779 | A1* | 6/2019 | Janakiraman | H04L 12/2807 |
| 2019/0268473 | A1* | 8/2019 | Amir | G06T 11/60 |
| 2020/0073935 | A1* | 3/2020 | Hite | G09B 19/0092 |
| 2020/0177960 | A1* | 6/2020 | Rakshit | H04N 21/2187 |
| 2021/0312951 | A1 | 10/2021 | Kakde et al. | |

OTHER PUBLICATIONS

ABB Ability Ellipse WFM Hands-Free Inspector, 2018 [retrieved Jun. 17, 2020] retrieved from the Internet URL: https://library.e.abb.com/public/3400c84784614bafb9a40f5d3a05f2cc/Ellipse-WFM-HFI_9AKK107046A3491-US-web.pdf, 2 pages.

PTC Vuforia Expert Capture, 2020 [retrieved Jun. 17, 2020] retrieved from the Internet URL: https://www.ptc.com/en/products/augmented-reality/vuforia-expert-capture, 10 pages.

Non-Final Office Action received for U.S. Appl. No. 17/249,663, dated Nov. 23, 2021, 19 pages.

International Search Report and Written Opinion issued in International Application No. PCT/US2021/040905 dated Nov. 3, 2021, 16 pages.

Requesting or giving remote control, Zoom, Retrieved from the internet: URL: https://support.zoom.us/hc/en-us/articles/201362673-Requesting-or-giving-remote-control [retrieved on Oct. 25, 2021] (2 pages).

Set up and pair Apple Watch with iPhone, Apple Watch User Guide, Mar. 31, 2020, Retrieved from the Internet: URL: https://support.apple.com/en-gb/guide/watch/apdde4d6f98e/watchos [retrieved on Oct. 25, 2021] (4 pages).

Final Rejection dated May 10, 2022 for U.S. Appl. No. 17/249,663.

Non-Final Office Action dated Oct. 17, 2022 for U.S. Appl. No. 17/249,663.

Final Rejection dated Apr. 28, 2023 for U.S. Appl. No. 17/249,663, 18 page(s).

Non-Final Office Action dated Apr. 28, 2023 for U.S. Appl. No. 16/841,454.

Advisory Action (PTOL-303) dated Jul. 10, 2023 for U.S. Appl. No. 17/249,663, 3 page(s).

Notice of Allowance and Fees Due (PTOL-85) dated Nov. 13, 2023 for U.S. Appl. No. 17/249,663, 9 page(s).

* cited by examiner

COMPARING, BY A DEVICE COMPRISING A PROCESSOR, MEDIA DATA RELATED TO A STEP OF A VIDEO PROCEDURE FOR AN INDUSTRIAL TASK WITH A CATEGORY DICTIONARY TO DETERMINE A CATEGORY FOR THE STEP OF THE VIDEO PROCEDURE, WHERE THE CATEGORY DICTIONARY COMPRISES A MAPPING OF KEYWORDS TO A PLURALITY OF CATEGORIES 702

LINKING, BY THE DEVICE AND BASED ON THE CATEGORY FOR THE STEP OF THE VIDEO PROCEDURE, THE STEP OF THE VIDEO PROCEDURE WITH AT LEAST A PORTION OF A SECOND VIDEO PROCEDURE TO GENERATE A HYPERVIDEO THAT COMPRISES AN INDUSTRIAL SUB-TASK FOR THE INDUSTRIAL TASK, WHERE THE HYPERVIDEO IS A VIDEO STREAM THAT COMPRISES ONE OR MORE INTERACTIVE HYPERMEDIA ELEMENTS ASSOCIATED WITH THE INDUSTRIAL TASK 704

DISPLAYING, BY THE DEVICE, THE HYPERVIDEO VIA A HEAD-MOUNTED VISUAL DISPLAY OF A WEARABLE DEVICE 706

FIG. 7

HYPERMEDIA ENABLED PROCEDURES FOR INDUSTRIAL WORKFLOWS ON A VOICE DRIVEN PLATFORM

TECHNICAL FIELD

The present disclosure relates generally to wearable devices, and more particularly to hypermedia for wearable device technologies.

BACKGROUND

Industrial field workers often rely on paper-based operating procedure documentation to perform tasks in an industrial environment. Certain tasks in an industrial environment generally involve visualization of industrial equipment and/or interaction with industrial equipment. However, it is often difficult for an industrial field worker to memorize each and every procedure for a given task in an industrial environment. Furthermore, it is often difficult for an industrial worker to carry paper-based operating procedure documentation along with other tools and/or safety equipment.

BRIEF SUMMARY

In accordance with an embodiment of the present disclosure, a system comprising a processor and a memory is provided. The memory stores executable instructions that, when executed by the processor, cause the processor to receive, from a first control system, a first control command for a vehicle. The executable instructions further cause the processor to compare media data related to a step of a video procedure for an industrial task with a category dictionary to determine a category for the step of the video procedure. The category dictionary comprises a mapping of keywords to a plurality of categories. The executable instructions further cause the processor to link, based on the category for the step of the video procedure, the step of the video procedure with at least a portion of a second video procedure to generate a hypervideo that comprises an industrial sub-task for the industrial task. The hypervideo is a video stream that comprises one or more interactive hypermedia elements associated with the industrial task. Furthermore, the executable instructions cause the processor to display the hypervideo via a head-mounted visual display of a wearable device.

In accordance with another embodiment of the present disclosure, a computer-implemented method is provided. The computer-implemented method provides for comparing, by a device comprising a processor, media data related to a step of a video procedure for an industrial task with a category dictionary to determine a category for the step of the video procedure, wherein the category dictionary comprises a mapping of keywords to a plurality of categories. The computer-implemented method also provides for linking, by the device and based on the category for the step of the video procedure, the step of the video procedure with at least a portion of a second video procedure to generate a hypervideo that comprises an industrial sub-task for the industrial task, wherein the hypervideo is a video stream that comprises one or more interactive hypermedia elements associated with the industrial task. Furthermore, the computer-implemented method provides for displaying, by the device the hypervideo via a head-mounted visual display of a wearable device.

In accordance with yet another embodiment of the present disclosure, a computer program product is provided. The computer program product at least one computer-readable storage medium having program instructions embodied thereon, the program instructions executable by a processor to cause the processor to compare media data related to a step of a video procedure for an industrial task with a category dictionary to determine a category for the step of the video procedure, wherein the category dictionary comprises a mapping of keywords to a plurality of categories. Furthermore, the program instructions are executable by the processor to cause the processor to link, based on the category for the step of the video procedure, the step of the video procedure with at least a portion of a second video procedure to generate a hypervideo that comprises an industrial sub-task for the industrial task, wherein the hypervideo is a video stream that comprises one or more interactive hypermedia elements associated with the industrial task. The program instructions are also executable by the processor to cause the processor to display the hypervideo via a head-mounted visual display of a wearable device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 illustrates a flow diagram for facilitating hypermedia enabled procedures for industrial workflows on a voice driven platform related to a wearable device, in accordance with one or more embodiments described herein;

DETAILED DESCRIPTION

Figure 1:
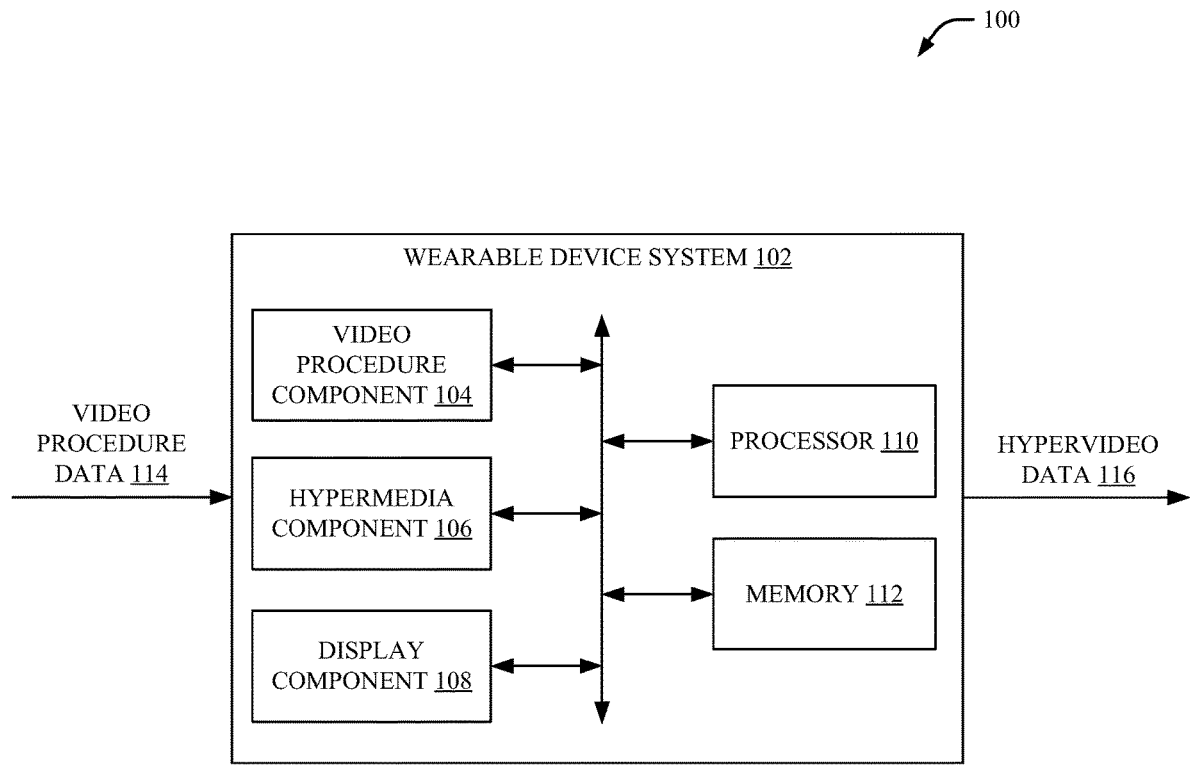
FIG. 1 illustrates a wearable device system, in accordance with one or more embodiments described herein.

Various embodiments of the present invention now will be described more fully hereinafter with reference to the accompanying drawings, in which some, but not all embodiments of the invention are shown. Indeed, the invention can be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

Industrial field workers often rely on paper-based operating procedure documentation to perform tasks in an industrial environment. Certain tasks in an industrial environment generally involve visualization of industrial equipment and/or interaction with industrial equipment. However, it is often difficult for an industrial field worker to memorize each and every procedure for a given task in an industrial environment. For instance, a task in an industrial environment is often performed in dynamic field conditions and can be associated with work flow procedures, task failure work flow procedures, emergency situation procedures and/or one or more other procedures. Furthermore, it is often difficult for an industrial worker to carry paper-based operating procedure documentation along with other tools and/or safety equipment.

Thus, to address these and/or other issues, hypermedia enabled procedures for industrial workflows on a voice driven platform related to a wearable device is disclosed herein. The wearable device is, for example, a wearable computer with a head-mounted visual display that provides video, audio, real-time data, documents, work procedures, health and safety information, and/or other information in response to voice commands associated with a voice-controlled user interface. Example embodiments disclosed herein categorize (e.g., classify) steps in a video procedure for an industrial task. The video procedure is a logical grouping of one or more guided steps associated with sub-videos to complete the industrial task. A step of the video procedure, in certain embodiments, is representative of sub-tasks or increments which facilitate completion of the industrial task. In an embodiment, keywords in a step name for a step in a video procedure are identified and compared against a category dictionary to determine a category for the step. The category dictionary contains, in certain embodiments, a mapping of keywords to categories. A category can include, for example, a prerequisite category, a safety category, a check category, an action category, and/or another type of category related to a step for an industrial task. In another embodiment, a text transcript from audio for the video procedure is extracted using a voice-to-text process (e.g., a speech recognition process). Words from the extracted text transcript is compared against the category dictionary to determine a category for the step. In certain embodiments, a user additionally or alternatively provides metadata and/or metatags associated with steps in the video procedure to facilitate categorization of a step in a video procedure.

Example embodiments disclosed herein additionally create hypermedia for the industrial task. For instance, in an embodiment, two or more video procedures in a step description are hyperlinked to create a hypervideo. The hypervideo is a video stream that comprises one or more interactive hypermedia elements associated with the industrial task. The hypervideo also allows the video procedure to follow a non-linear information structure to, for example, allow an industrial field worker or an industrial field operator to make decisions based on content of the video procedure and dynamic field needs in an industrial environment. In certain embodiments, as context of the procedure changes with each step (e.g., time-based context), different hypervideos are linked to create a main procedure with different branches and/or different levels associated with sub-procedures for the industrial task. In an embodiment, one or more documents are hyperlinked to the video procedure based on a document indexing technique and/or a search technique. Additionally or alternatively, in an embodiment, a work history is hyperlinked to the video procedure based on a search technique with respect to a digital logbook. Additionally or alternatively, in an embodiment, a video conference associated with an on demand expert is hyperlinked to the video procedure based on a search technique with respect to a user profile database. In certain embodiments, two or more video procedures in a step description are hyperlinked based on metadata added to the video procedures in response to categorization of steps for the video procedure. In certain embodiments, the video procedure is segmented into frames. Furthermore, an object detection process is employed to identify objects in the frames. The objects are then compared against an industrial dictionary to generate metadata for the object. The metadata for the objects is employed, in certain embodiments, to link two or more video procedures.

As such, a comprehensive guide video for an industrial task that provides detailed procedures for dynamic situations in an industrial environment is provided. In certain embodiments, a main video procedure includes technical information for the industrial task and branched video procedures that branch from the main video procedure includes additional tips for the industrial task. Context switching while performing an industrial task is also improved by allowing faster and/or more seamless context switching within a single video procedure for an industrial task. Critical steps (e.g., safety steps, emergency steps, etc.) is also highlighted in the video procedure, in certain embodiments. Special emphasis on the critical steps can therefore be provided during the industrial task. Furthermore, in certain embodiments, step categories are filtered to view a particular category of steps. For instance, in certain embodiments, only "Action" steps are presented via the wearable device. Moreover, a wearable device is improved by reducing processing requirements for the wearable device, reducing power consumption of the wearable device, and/or optimizing rendering of data via the head-mounted visual display of the wearable device.

FIG. 1 illustrates a system 100 that provides an exemplary environment within which one or more described features of one or more embodiments of the disclosure can be implemented. According to an embodiment, the system 100 includes a wearable device system 102 to facilitate a practical application of wearable technology to provide a handsfree, wearable device for industrial field workers. The wearable device system 102 is also related to one or more technologies for wearable devices, such as, for example, wearable device technologies, wearable computer technologies, industrial technologies, connected industrial plant technologies, industrial Internet of Things (IIoT) technologies, navigation and asset visualization technologies, oil and gas technologies, petrochemical technologies, refinery technologies, process plant technologies, cloud technologies, cloud database technologies, network technologies, wireless communication technologies, video technologies, geolocation technologies, sensor technologies, machine learning technologies, artificial intelligence technologies, digital signal processing technologies, electronic device technologies, computer technologies, and/or one or more other technologies. Moreover, the wearable device system 102 provides an improvement to one or more technologies such as wearable device technologies, wearable computer technologies, industrial technologies, connected industrial plant technologies, industrial Internet of Things (IIoT) technologies, navigation and asset visualization technologies, oil and gas technologies, petrochemical technologies, refinery technologies, process plant technologies, cloud technologies, cloud database technologies, network technologies, wireless communication technologies, video technologies, geolocation technologies, sensor technologies, machine learning technologies, artificial intelligence technologies, digital signal processing technologies, electronic device technologies, computer technologies, and/or one or more other technologies. In an implementation, the wearable device system 102 improves performance of a wearable device. For example, the wearable device system 102 can improve processing efficiency of a wearable device, reduce power consumption of a wearable device, improve quality of data provided by a wearable device, etc. The wearable device system 102 includes a video procedure component 104, a hypermedia component 106 and/or a display component 108. Additionally, in certain embodiments, the wearable device system 102 includes a processor 110 and/or a memory 112. In certain embodiments, one or more aspects of the wearable device system 102 (and/or other systems, apparatuses and/or processes disclosed herein) constitute executable instructions embodied within a computer-readable storage medium (e.g., the memory 112). For instance, in an embodiment, the memory 112 stores computer executable component and/or executable instructions (e.g., program instructions). Furthermore, the processor 110 facilitates execution of the computer executable components and/or the executable instructions (e.g., the program instructions). In an example embodiment, the processor 110 is configured to execute instructions stored in the memory 112 or otherwise accessible to the processor 110.

The processor 110 is a hardware entity (e.g., physically embodied in circuitry) capable of performing operations according to one or more embodiments of the disclosure. Alternatively, in an embodiment where the processor 110 is embodied as an executor of software instructions, the software instructions configure the processor 110 to perform one or more algorithms and/or operations described herein in response to the software instructions being executed. In an embodiment, the processor 110 can be a single core processor, a multi-core processor, multiple processors internal to the wearable device system 102, a remote processor (e.g., a processor implemented on a server), and/or a virtual machine. In certain embodiments, the processor 110 is in communication with the memory 112, the video procedure component 104, the hypermedia component 106 and/or the display component 108 via a bus to, for example, facilitate transmission of data among the processor 110, the memory 112, the video procedure component 104, the hypermedia component 106 and/or the display component 108. The processor 110 can be embodied in a number of different ways and can, in certain embodiments, include one or more processing devices configured to perform independently. Additionally or alternatively, the processor 110 can include one or more processors configured in tandem via a bus to enable independent execution of instructions, pipelining of data, and/or multi-thread execution of instructions. The memory 112 is non-transitory and includes, for example, one or more volatile memories and/or one or more non-volatile memories. In other words, for example, the memory 112 can be an electronic storage device (e.g., a computer-readable storage medium). The memory 112 is configured to store information, data, content, one or more applications, one or more instructions, or the like, to enable the wearable device system 102 to carry out various functions in accordance with one or more embodiments disclosed herein. As used herein in this disclosure, the term "component," "system," and the like, is a computer-related entity. For instance, "a component," "a system," and the like disclosed herein can be either hardware, software, or a combination of hardware and software. As an example, a component can be, but is not limited to, a process executed on a processor, a processor, circuitry, an executable component, a thread of instructions, a program, and/or a computer entity.

Figure 2:
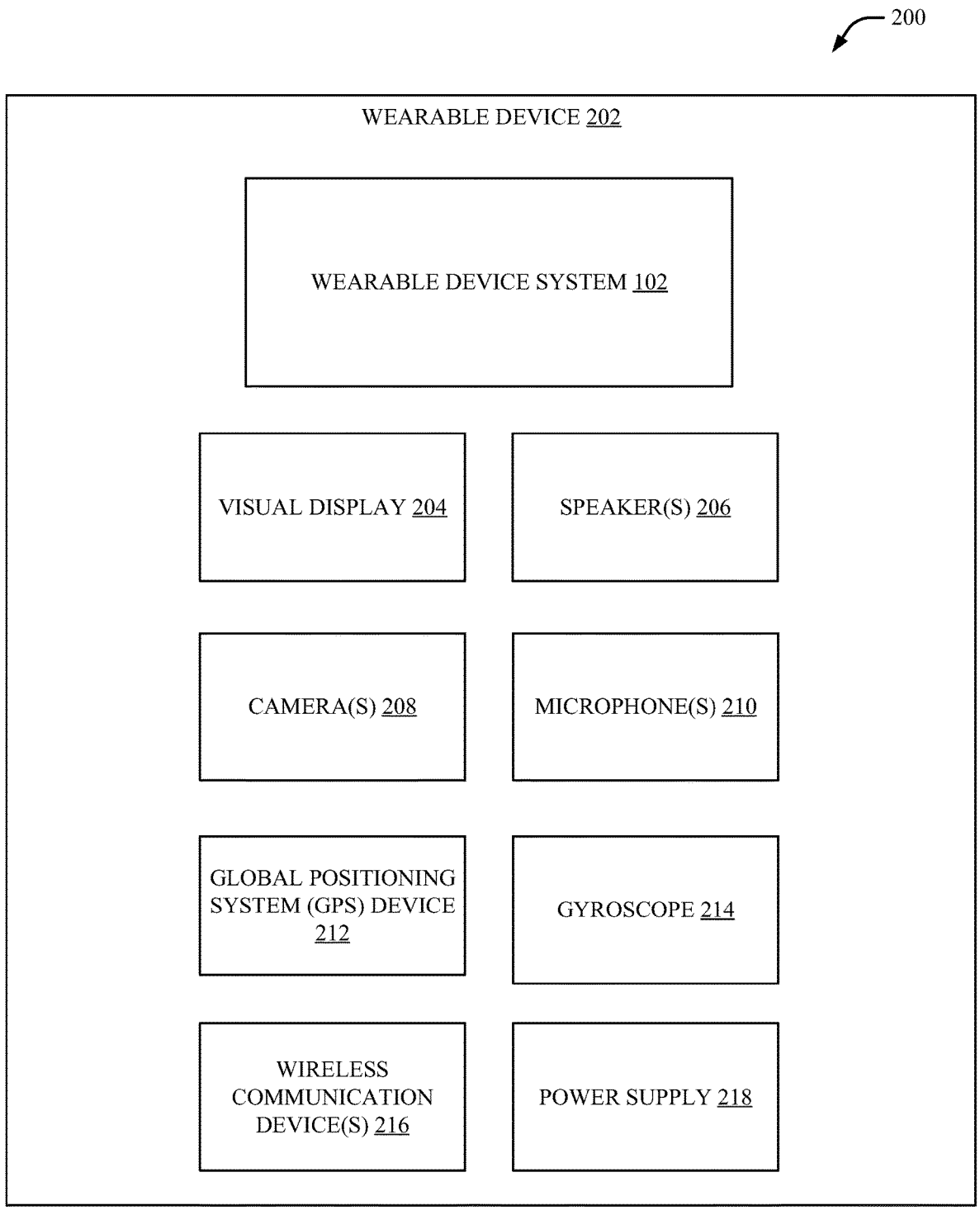
FIG. 2 illustrates a wearable that includes the wearable device system, in accordance with one or more embodiments described herein.

The wearable device system 102 is a wearable device system of a wearable device (e.g., wearable device 202 shown in FIG. 2). In an embodiment, the wearable device system 102 (e.g., the video procedure component 104 of the wearable device system 102) receives video procedure data 114. The video procedure data 114 is, for example, data related to a video procedure for an industrial task. In an aspect, the video procedure is a logical grouping of one or more steps with corresponding sub-videos to guide a user towards completion of the industrial task. A step of the video procedure, in certain embodiments, is representative of sub-tasks which facilitate completion of the industrial task. In another aspect, the video procedure data 114 includes media data related to the video procedure such as, for example, textual data (e.g., a step name, a description, a date of creation, a date of publishing, an author, a size, one or more keywords, etc.) related to one or more steps of the video procedure, video data related to one or more steps of the video procedure, audio data related to one or more steps of the video procedure, metadata related to one or more steps of the video procedure, and/or other media data related to one or more steps of the video procedure.

In an embodiment, the video procedure component 104 compares media data related to respective steps of the video procedure with a category dictionary to determine a category for the respective steps of the video procedure. For instance, the video procedure component 104 compares first media data related to a first step of the video procedure with the category dictionary to determine a first category for the first step of the video procedure, the video procedure component 104 compares second media data related to a second step of the video procedure with the category dictionary to determine a second category for the second step of the video procedure, etc. A category is, for example, a classification for a step of the video procedure. The category dictionary includes, for example, a mapping of words (e.g., keywords) to a plurality of categories. For instance, a word "ensure" can be mapped to a category "Check" for the industrial task, a word "start" can be mapped to a category "Action" for the industrial task, a word "stop" can be mapped to a category "Action" for the industrial task, a word "in service" can be mapped to a category "Check" for the industrial task, a word "primed" can be mapped to a category "Check" for the industrial task, a word "isolation" can be mapped to a category "Safety" for the industrial task, a word "close" can be mapped to a category "Action" for the industrial task, a word "in standby" can be mapped to a category "check" for the industrial task, etc.

In certain embodiments, the video procedure component 104 performs learning (e.g., deep learning, etc.) with respect to the video procedure data 114 to determine one or more classifications, one or more correlations, one or more expressions, one or more inferences, one or more patterns, one or more features and/or other learned information related to the steps of the video procedure. The learning performed by the video procedure component 104 can be performed explicitly or implicitly with respect to the video procedure data 114. In another aspect, the video procedure component 104 employs a machine learning model to determine one or more classifications, one or more correlations, one or more expressions, one or more inferences, one or more patterns, one or more features and/or other learned information related to the video procedure data 114. In an example, the machine learning model employed by the video procedure component 104 utilizes one or more inference-based schemes to determine one or more classifications, one or more correlations, one or more expressions, one or more inferences, one or more patterns, one or more features and/or other learned information related to the video procedure data 114. In one embodiment, the video procedure component 104 employs a support vector machine (SVM) classifier to determine one or more classifications, one or more correlations, one or more expressions, one or more inferences, one or more patterns, one or more features and/or other learned information related to the video procedure data 114. In another embodiment, the video procedure component 104 employs one or more machine learning classification techniques associated with a Bayesian machine learning network, a binary classification model, a multiclass classification model, a linear classifier model, a quadratic classifier model, a neural network model, a probabilistic classification model, decision trees and/or one or more other classification models.

The hypermedia component 106 links, based on the respective categories for the respective steps of the video procedure, the respective steps of the video procedure with at least a portion of another video procedure to generate a hypervideo. For instance, the hypermedia component 106 links, based on the first category for the first step of the video procedure, the first step of the video procedure with at least a portion of another video procedure. Furthermore, the hypermedia component 106 links, based on the second category for the second step of the video procedure, the second step of the video procedure with at least a portion of another video procedure. The hypervideo is a video stream. In an aspect, the hypervideo includes one or more industrial sub-tasks for the industrial task. In another aspect, the hypervideo includes one or more interactive hypermedia elements associated with the industrial task. In an embodiment, the hypermedia component 106 can generate hypervideo data 116 that includes at least the hypervideo. The hypervideo data 116 additionally or alternatively includes, in certain embodiments, one or more interactive hypermedia elements associated with video, audio, real-time data, documents, work procedures, health and safety information, and/or other information. In certain embodiments, the video procedure component 104 generates first metadata for the video procedure based on the category for a step of the video procedure. Furthermore, the hypermedia component 106 links the step of the video procedure with at least the portion of the second video procedure based on second metadata for the second video procedure. In certain embodiments, the video procedure component 104 segments the video procedure to generate a segmented portion of the video procedure that is associated with a step of the video procedure. Furthermore, the video procedure component 104 determines the media data based on an object detection process associated with the segmented portion of the video procedure.

The display component 108 displays the hypervideo via a visual display (e.g., visual display 204 shown in FIG. 2) of the wearable device (e.g., the wearable device 202). For instance, the display component 108 displays the hypervideo data 116 via the visual display. The visual display of the wearable device is, for example, a head-mounted visual display. In certain embodiments, the hypermedia component 106 links, based on a category for a step of the video procedure, the step of the video procedure with a document associated with the step for the industrial task. Furthermore, the display component 108 displays data related to the document as an interactive hypermedia element of the hypervideo via the visual display of the wearable device. In certain embodiments, the hypermedia component 106 links, based on a category for a step of the video procedure, the step of the video procedure with an audio recording associated with the step for the industrial task. Furthermore, the display component 108 presents the audio recording as an interactive hypermedia element of the hypervideo via a speaker of the wearable device. In certain embodiments, the hypermedia component 106 links, based on a category for a step of the video procedure, the step of the video procedure with historical data associated with a work history for the step for the industrial task. Furthermore, the display component 108 displays the historical data as an interactive hypermedia element of the hypervideo via the visual display of the wearable device. In certain embodiments, the display component 108 initiates, based on a category for a step of the video procedure, a video conference between the wearable device and a computing device associated with an on-demand expert.

FIG. 2 illustrates a system 200 that provides an exemplary environment within which one or more of the described features of one or more embodiments of the disclosure can be implemented. The system 200 includes a wearable device 202. The wearable device 202 is a wearable computer. For instance, in an embodiment, the wearable device 202 capable of being worn by a human. In an aspect, the wearable device 202 employs handsfree mobile computing, augmented reality, cloud-based computing, IIoT technology and/or one or more other technologies to provide video, audio, real-time data, documents, work procedures, health and safety information, and/or other information in response to voice commands associated with a voice-controlled user interface. The wearable device 202 includes mechanical components, electrical components, hardware components and/or software components to facilitate intelligent wearable technology for industrial field workers. In the embodiment shown in FIG. 2, the wearable device 202 includes the wearable device system 102, a visual display 204, one or more speakers 206, one or more cameras 208, one or more microphones 210, a global positioning system (GPS) device 212, a gyroscope 214, one or more wireless communication devices 216, and/or a power supply 218.

In an embodiment, the visual display 204 is a head-mounted visual display that renders visual data via a set of pixels. The one or more speakers 206 include one or more integrated speakers that project audio. The one or more cameras 208 include one or more cameras that employ autofocus and/or image stabilization for hi-resolution photo capture and/or real-time video chat. The one or more microphones 210 include one or more digital microphones that employ active noise cancellation to capture audio data. The GPS device 212 provides a geographic location for the wearable device 206. The gyroscope 214 provides an orientation for the wearable device 206. The one or more wireless communication devices 216 includes one or more hardware components to provide wireless communication via one or more wireless networking technologies and/or one or more short-wavelength wireless technologies. The power supply 218 is, for example, a rechargeable battery that provides power to the wearable device system 102, the visual display 204, the one or more speakers 206, the one or more cameras 208, the one or more microphones 210, the GPS device 212, the gyroscope 214, and/or the one or more wireless communication devices 216. In certain embodiments, the wearable device system 102 employs data provided by the one or more cameras 208, the one or more microphones 210, the GPS device 212, the gyroscope 214, and/or the one or more wireless communication devices 216 to facilitate generation of the hypervideo data 116. Furthermore, in certain embodiments, at least a portion of the hypervideo data 116 is presented via the visual display 204 and/or the one or more speakers 206.

Figure 3:
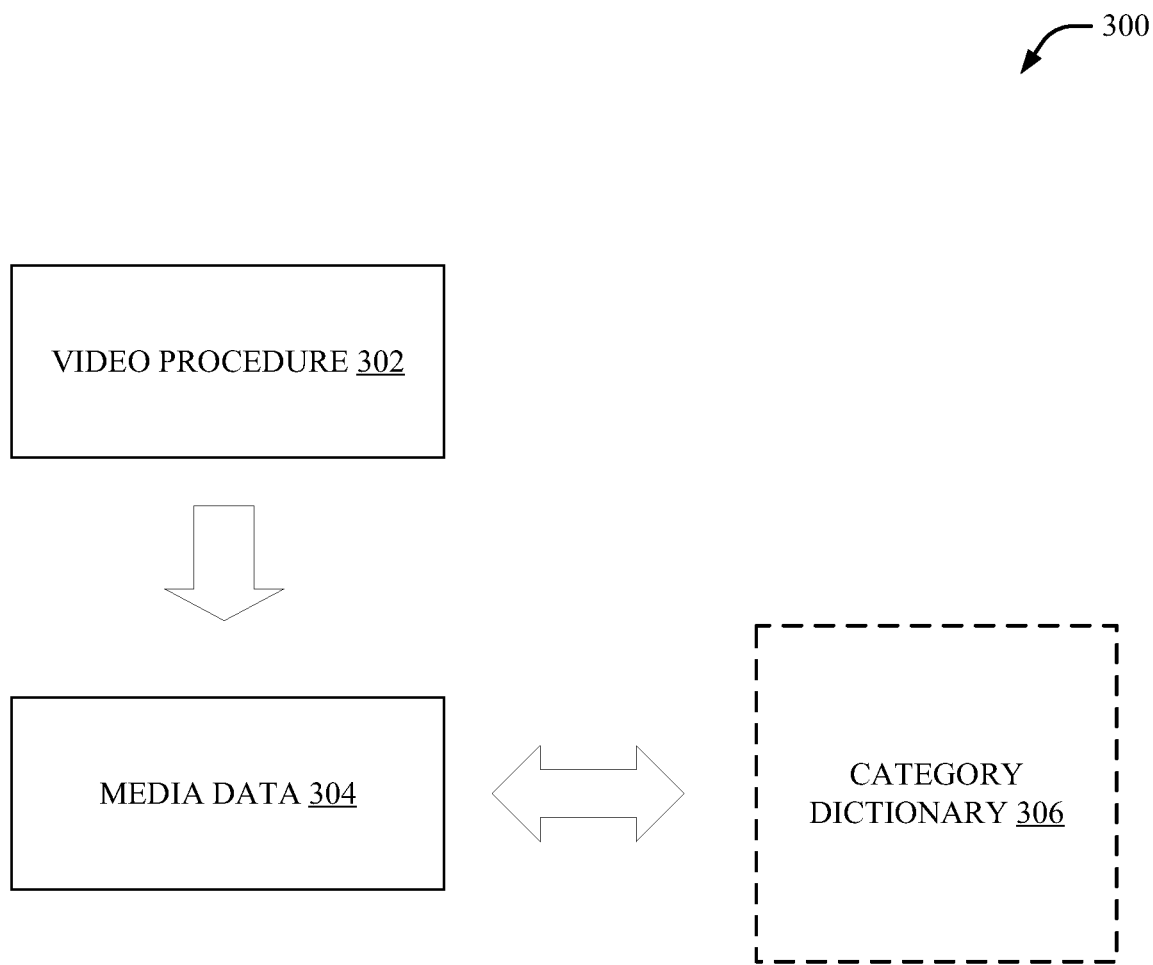
FIG. 3 illustrates a system for facilitating hypermedia enabled procedures for industrial workflows on a voice driven platform related to a wearable device, in accordance with one or more embodiments described herein.

FIG. 3 illustrates system 300 for facilitating hypermedia enabled procedures for industrial workflows on a voice driven platform related to a wearable device, in accordance with one or more embodiments described herein. The system 300 is associated with the wearable device system 102, for example. As shown in FIG. 3, media data 304 is extracted from a video procedure 302. The video procedure 302 is a video procedure for an industrial task. The media data 304 is extracted, for example, by the video procedure component 104. In an embodiment, the video procedure component 104 extracts keywords from a step name of the video procedure 302. In another embodiment, the video procedure component 104 extracts a text transcript from audio of the video procedure 302. In yet another embodiment, the video procedure component 104 extracts metadata associated with steps in the video procedure 302. In yet another embodiment, the video procedure component 104 identifies objects in frames of the video procedure 302. In an aspect, the media data 304 includes the keywords, words from the text transcript, the metadata, and/or information related to the identified objects. In another aspect, the media data 304 is compared with a category dictionary 306. For example, the video procedure component 104 compares the media data 304 with the category dictionary 306. The category dictionary 306 includes a mapping of keywords to respective categories for the industrial task, a mapping of words to respective categories for the industrial task, a mapping of metadata to respective categories for the industrial task, and/or a mapping of objects to respective categories for the industrial task.

Figure 4:
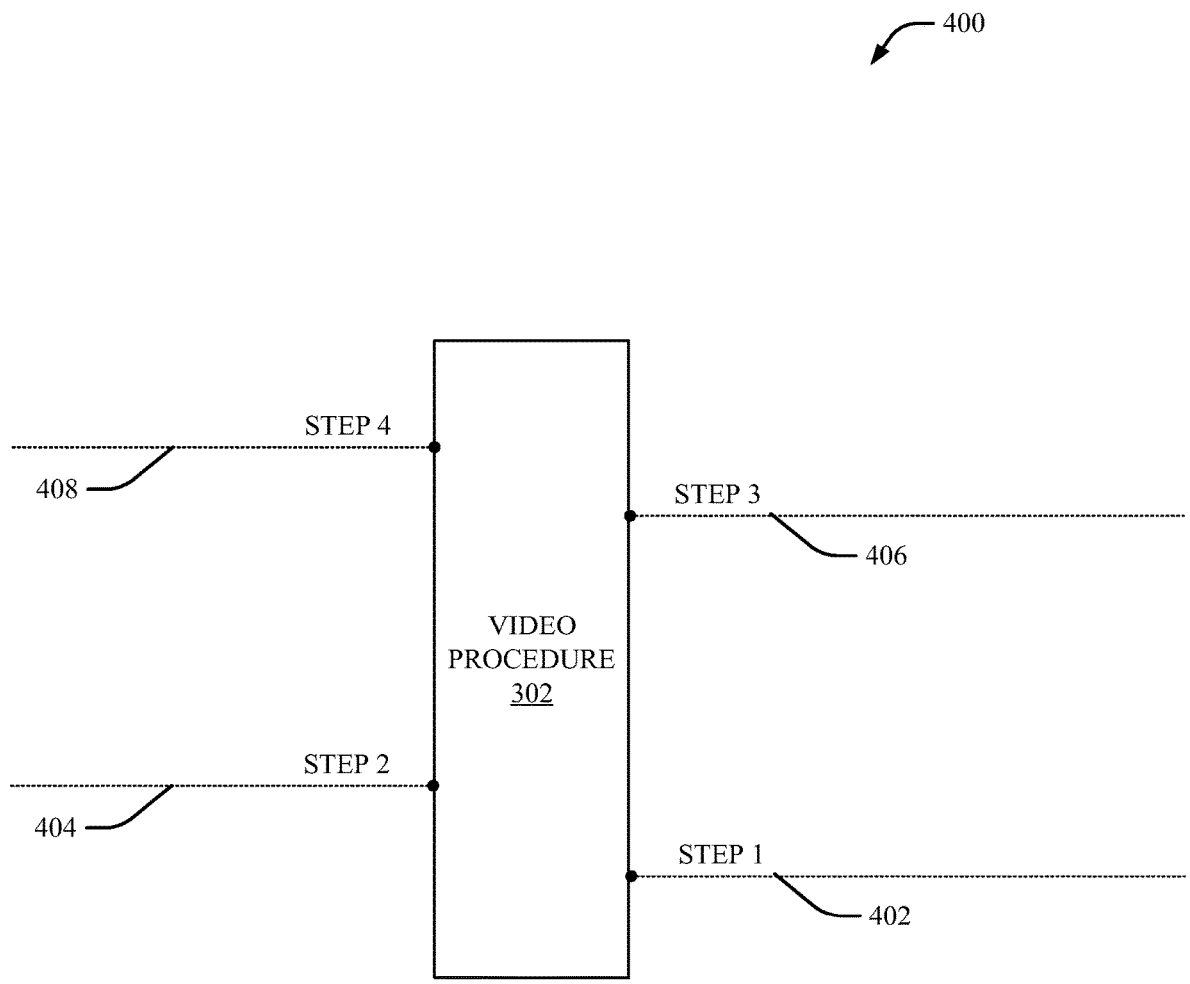
FIG. 4 illustrates another system for facilitating hypermedia enabled procedures for industrial workflows on a voice driven platform related to a wearable device, in accordance with one or more embodiments described herein.

FIG. 4 illustrates system 400 for facilitating hypermedia enabled procedures for industrial workflows on a voice driven platform related to a wearable device, in accordance with one or more embodiments described herein. The system 400 is associated with the wearable device system 102, for example. The system 400 includes the video procedure 302. As shown in FIG. 4, the video procedure 302 includes a step 402 (e.g., STEP 1), a step 404 (e.g., STEP 2), a step 406 (e.g., STEP 3) and a step 408 (e.g., STEP 4). The step 402 is a step for the industrial task. Furthermore, in an embodiment, the step 402 is associated with a sub-video for the video procedure 302. In a non-limiting example, the step 402 is a step such as "ensure packing oil reservoir is sufficient." The step 404 is also a step for the industrial task. Furthermore, in an embodiment, the step 404 is associated with another sub-video for the video procedure 302. In a non-limiting example, the step 404 is a step such as "ensure the following line ups in packing oil." The step 406 is also a step for the industrial task. Furthermore, in an embodiment, the step 406 is associated with another sub-video for the video procedure 302. In a non-limiting example, the step 406 is a step such as "packing oil supply and return isolation valves are open for each cylinder." The step 408 is also a step for the industrial task. Furthermore, in an embodiment, the step 408 is associated with another sub-video for the video procedure 302. In a non-limiting example, the step 408 is a step such as "start one of the packing oil pump and check discharge pressure."

Figure 5:
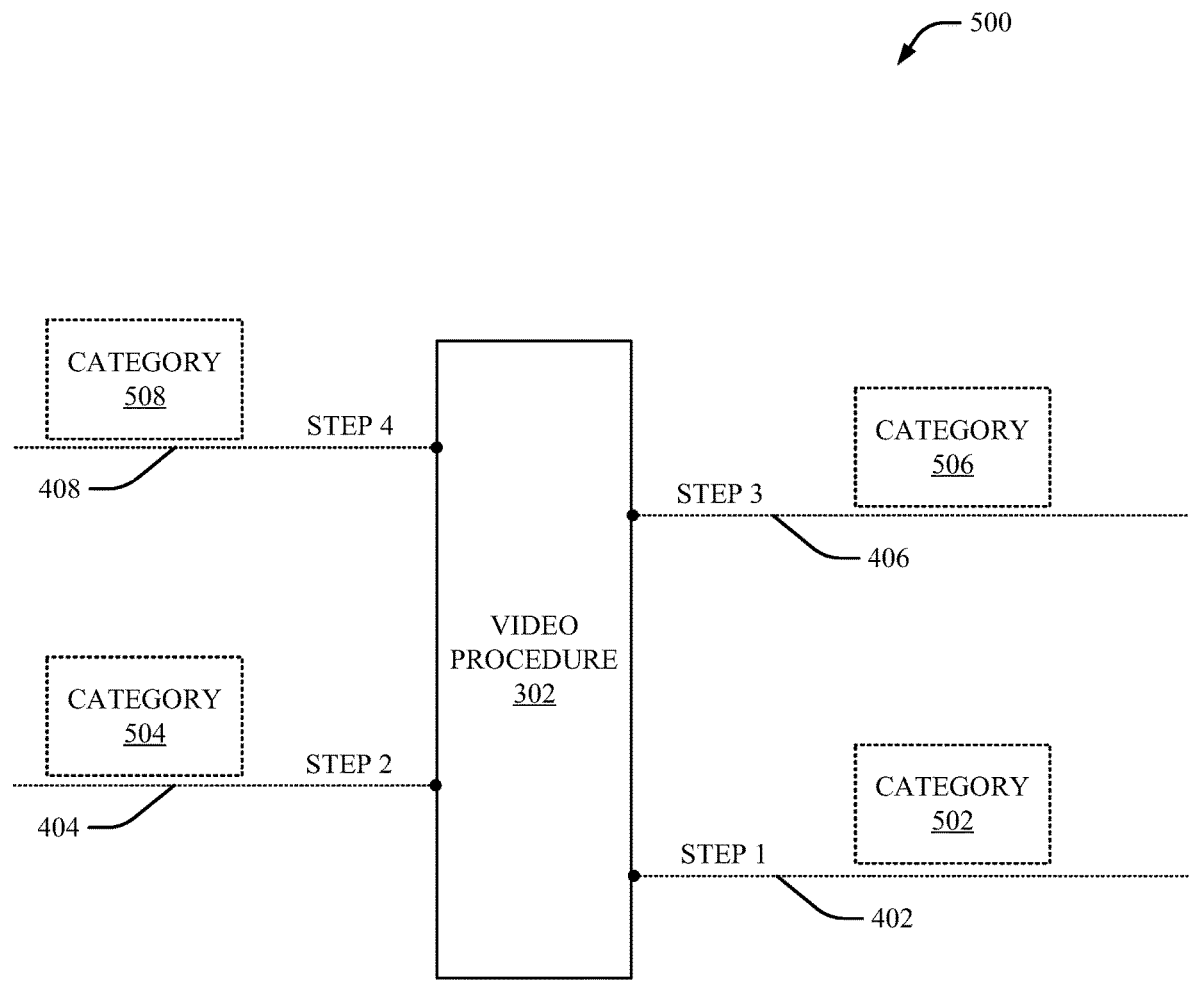
FIG. 5 illustrates yet another system for facilitating hypermedia enabled procedures for industrial workflows on a voice driven platform related to a wearable device, in accordance with one or more embodiments described herein.

FIG. 5 illustrates system 500 for facilitating hypermedia enabled procedures for industrial workflows on a voice driven platform related to a wearable device, in accordance with one or more embodiments described herein. The system 500 is associated with the wearable device system 102, for example. The system 500 includes the video procedure 302. As shown in FIG. 5, the video procedure 302 includes the step 402, the step 404, the step 406 and the step 408. Furthermore, as shown in FIG. 5, the step 402 is associated with a category 502, the step 404 is associated with a category 504, the step 406 is associated with a category 506, and the step 408 is associated with a category 508. For instance, in an embodiment, the video procedure component 104 classifies the step 402 to determine the category 502, the video procedure component 104 classifies the step 404 to determine the category 504, the video procedure component 104 classifies the step 406 to determine the category 506, and the video procedure component 104 classifies the step 408 to determine the category 508. The step 402, the step 404, the step 406 and the step 408 are classified into either a "Safety" category, an "Action" category, a "Check" category, or a "Pre-requisites" category, for example. In a non-limiting example, the category 502 for the step 402 corresponds to a "Check" category, the category 504 for the step 404 corresponds to a "Check" category, the category 506 for the step 406 corresponds to a "Safety" category, and the category 508 for the step 408 corresponds to an "Action" category.

In an embodiment, the video procedure component 104 extracts keywords from a step name for the step 402 to determine the category 502, the video procedure component 104 extracts keywords from a step name for the step 404 to determine the category 504, the video procedure component 104 extracts keywords from a step name for the step 406 to determine the category 506, and/or the video procedure component 104 extracts keywords from a step name for the step 408 to determine the category 508. Additionally or alternatively, the video procedure component 104 extracts a text transcript from audio associated with the sub-video for the step 402 to determine the category 502, the video procedure component 104 extracts a text transcript from audio associated with the sub-video for the step 404 to determine the category 504, the video procedure component 104 extracts a text transcript from audio associated with the sub-video for the step 406 to determine the category 506, and/or the video procedure component 104 extracts a text transcript from audio associated with the sub-video for the step 408 to determine the category 508. Additionally or alternatively, the video procedure component 104 extracts metadata associated the step 402 to determine the category 502, the video procedure component 104 extracts metadata associated the step 404 to determine the category 504, the video procedure component 104 extracts metadata associated the step 406 to determine the category 506, and/or the video procedure component 104 extracts metadata associated the step 408 to determine the category 508. Additionally or alternatively, the video procedure component 104 identifies objects in frames of the sub-video for the step 402 to determine the category 502, the video procedure component 104 identifies objects in frames of the sub-video for the step 404 to determine the category 504, the video procedure component 104 identifies objects in frames of the sub-video for the step 406 to determine the category 506, and/or the video procedure component 104 identifies objects in frames of the sub-video for the step 408 to determine the category 508.

Figure 6:
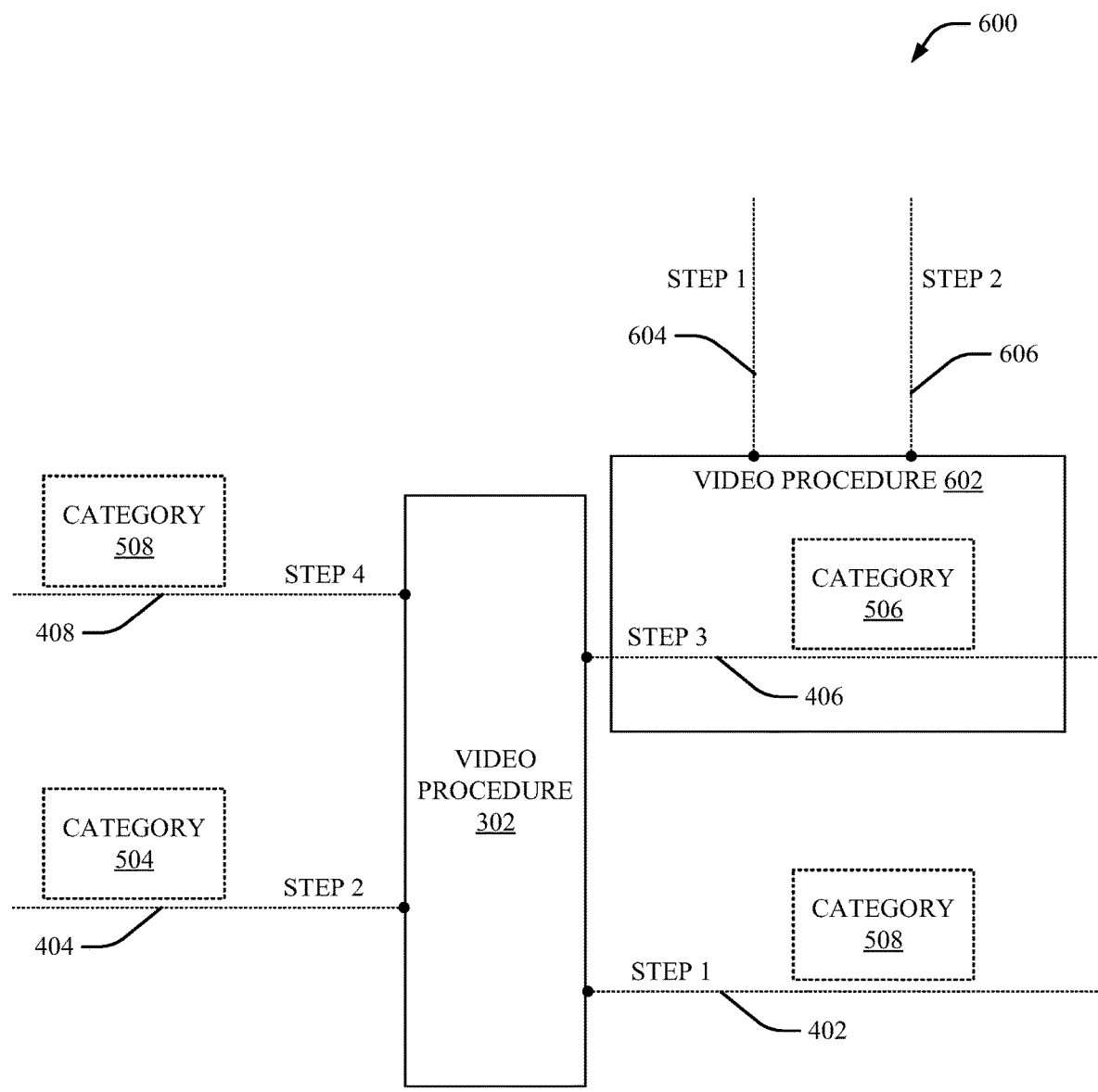
FIG. 6 illustrates yet another system for facilitating hypermedia enabled procedures for industrial workflows on a voice driven platform related to a wearable device, in accordance with one or more embodiments described herein.

FIG. 6 illustrates system 600 for facilitating hypermedia enabled procedures for industrial workflows on a voice driven platform related to a wearable device, in accordance with one or more embodiments described herein. The system 600 is associated with the wearable device system 102, for example. As shown in FIG. 6, the video procedure 302 includes the step 402, the step 404, the step 406 and the step 408. Also as shown in FIG. 6, the step 402 is associated with the category 502, the step 404 is associated with the category 504, the step 406 is associated with the category 506, and the step 408 is associated with the category 508. Furthermore, as shown in FIG. 6, the step 406 is linked with a video procedure 602. The video procedure 602 is, for example, a video procedure associated with a sub-task for the industrial task. For instance, the hypermedia component 106 links the step 406 with the video procedure 602 based on the category 506 for the step 406. In an aspect, the video procedure 602 includes a step 604 (e.g., STEP 1 for the video procedure 602) and a step 606 (e.g., STEP 2 for the video procedure 602). The step 604 is a sub-step for the industrial task. Furthermore, in an embodiment, the step 604 is associated with a sub-video for the video procedure 602. In a non-limiting example, the step 604 is a step such as "ensure that the packing supply oil filter is in line." The step 606 is also a sub-step for the industrial task. Furthermore, in an embodiment, the step 606 is associated with another sub-video for the video procedure 602. In a non-limiting example, the step 606 is a step such as "ensure that the packing supply oil is above the minimum step level." In an embodiment, the video procedure 602 is an alternate flow for the industrial task that deviates from a main flow of the video procedure 302 in response to dynamic situations in an industrial environment associated with the wearable device 202.

FIG. 7 illustrates a computer-implemented method 700 for facilitating hypermedia enabled procedures for industrial workflows on a voice driven platform related to a wearable device, in accordance with one or more embodiments described herein. The computer-implemented method 700 is associated with the wearable device system 102, for example. In one or more embodiments, the computer-implemented method 700 begins with comparing, by a device comprising a processor (e.g., by the video procedure component 104), media data related to a step of a video procedure for an industrial task with a category dictionary to determine a category for the step of the video procedure, where the category dictionary comprises a mapping of keywords to a plurality of categories (block 702). The computer-implemented method 700 also includes linking, by the device (e.g., by the hypermedia component 106) and based on the category for the step of the video procedure, the step of the video procedure with at least a portion of a second video procedure to generate a hypervideo that comprises an industrial sub-task for the industrial task, where the hypervideo is a video stream that comprises one or more interactive hypermedia elements associated with the industrial task (block 704). Furthermore, the computer-implemented method 700 includes displaying, by the device (e.g., by the display component 108), the hypervideo via a head-mounted visual display of a wearable device (block 706).

In certain embodiments, the computer-implemented method 700 also includes generating, by the device (e.g., by the video procedure component 104), first metadata for the video procedure based on the category for the step of the video procedure, wherein the linking comprises linking the step of the video procedure with at least the portion of the second video procedure based on second metadata for the second video procedure. In certain embodiments, the computer-implemented method 700 also includes segmenting, by the device (e.g., by the video procedure component 104), the video procedure to generate a segmented portion of the video procedure that is associated with the step of the video procedure. Additionally, in certain embodiments, the computer-implemented method 700 also includes determining, by the device (e.g., by the video procedure component 104), the media data based on an object detection process associated with the segmented portion of the video procedure. In certain embodiments, the computer-implemented method 700 also includes linking, by the device (e.g., by the hypermedia component 106) and based on the category for the step of the video procedure, the step of the video procedure with a document associated with the step for the industrial task. Additionally, in certain embodiments, the computer-implemented method 700 also includes displaying, by the device (e.g., by the display component 108), data related to the document as an interactive hypermedia element of the hypervideo via the head-mounted visual display of the wearable device.

In certain embodiments, the computer-implemented method 700 also includes linking, by the device (e.g., by the hypermedia component 106) and based on the category for the step of the video procedure, the step of the video procedure with an audio recording associated with the step for the industrial task. Additionally, in certain embodiments, the computer-implemented method 700 also includes presenting, by the device (e.g., by the display component 108), the audio recording as an interactive hypermedia element of the hypervideo via a speaker of the wearable device. In certain embodiments, the computer-implemented method 700 also includes linking, by the device (e.g., by the hypermedia component 106) and based on the category for the step of the video procedure, the step of the video procedure with historical data associated with a work history for the step for the industrial task. Additionally, in certain embodiments, the computer-implemented method 700 also includes displaying, by the device (e.g., by the display component 108), the historical data as an interactive hypermedia element of the hypervideo via the head-mounted visual display of the wearable device. In certain embodiments, the computer-implemented method 700 also includes initiating, by the device (e.g., by the hypermedia component 106) and based on the category for the step of the video procedure, a video conference between the wearable device and a computing device associated with an on-demand expert.

Figure 8:
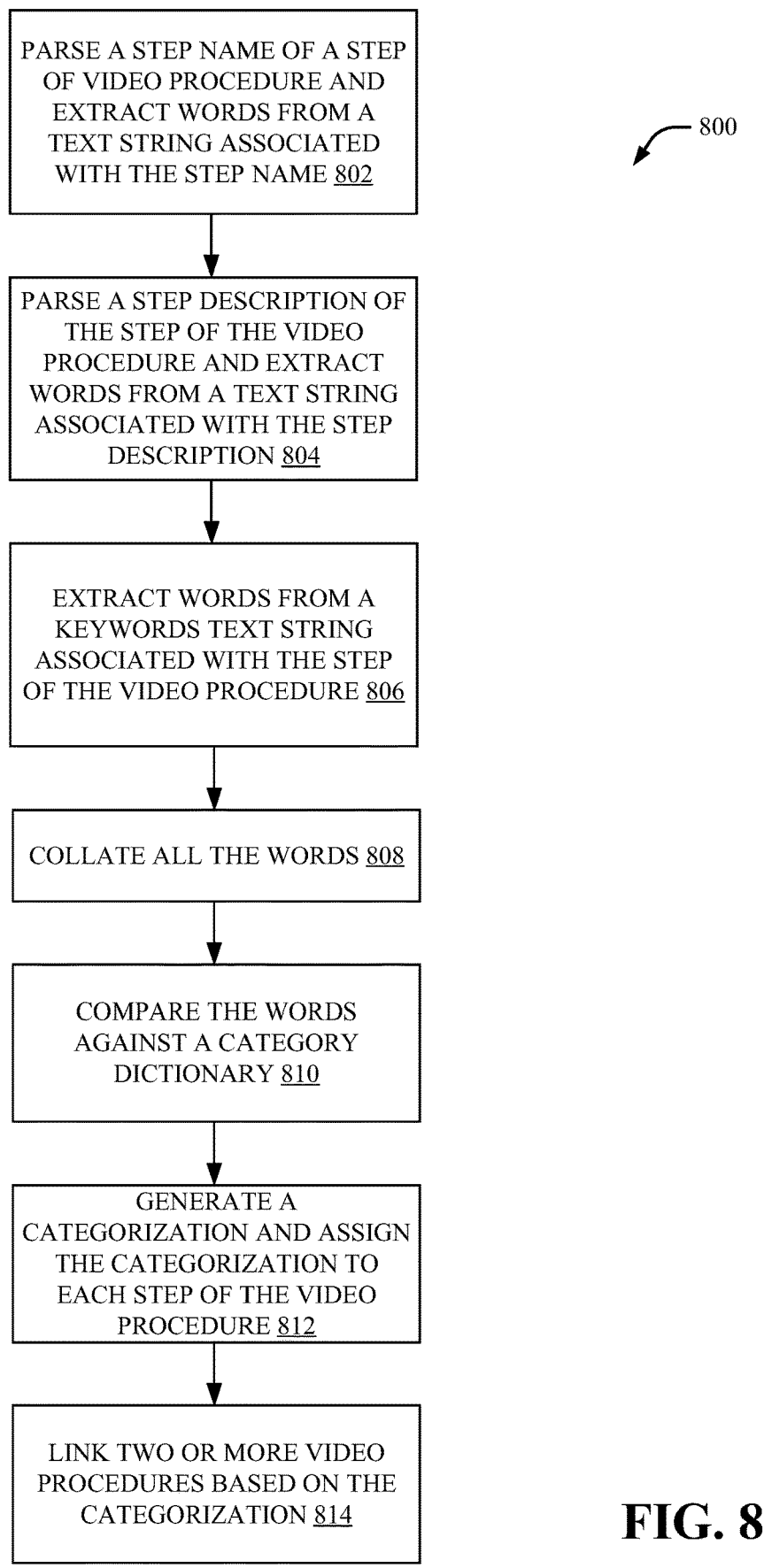
FIG. 8 illustrates a flow diagram for categorizing steps in a video procedure, in accordance with one or more embodiments described herein.

FIG. 8 illustrates a computer-implemented method 800 for categorizing steps in a video procedure, in accordance with one or more embodiments described herein. The computer-implemented method 800 is associated with the wearable device system 102, for example. In one or more embodiments, the computer-implemented method 800 begins at block 802 that parses (e.g., by the video procedure component 104) a step name of a step of a video procedure and extracts (e.g., by the video procedure component 104) words from a text string associated with the step name. The computer-implemented method 800 also includes a block 804 that parses (e.g., by the video procedure component 104) a step description of the step of the video procedure and extracts (e.g., by the video procedure component 104) words from a text string associated with the step description. The computer-implemented method 800 also includes a block 806 that extracts (e.g., by the video procedure component 104) words from a keywords text string associated with the step of the video procedure. Furthermore, the computer-implemented method 800 includes a block 808 that collates (e.g., by the video procedure component 104) all the words. The computer-implemented method 800 also includes a block 810 that compares (e.g., by the video procedure component 104) the words against a category dictionary. The computer-implemented method 800 also includes a block 812 that generates a categorization (e.g., by the video procedure component 104) and assigns the categorization (e.g., by the video procedure component 104) to each step of the video procedure. Furthermore, the computer-implemented method 800 includes a block 814 that links (e.g., by the video procedure component 104) two or more video procedures based on the categorization.

Figure 9:
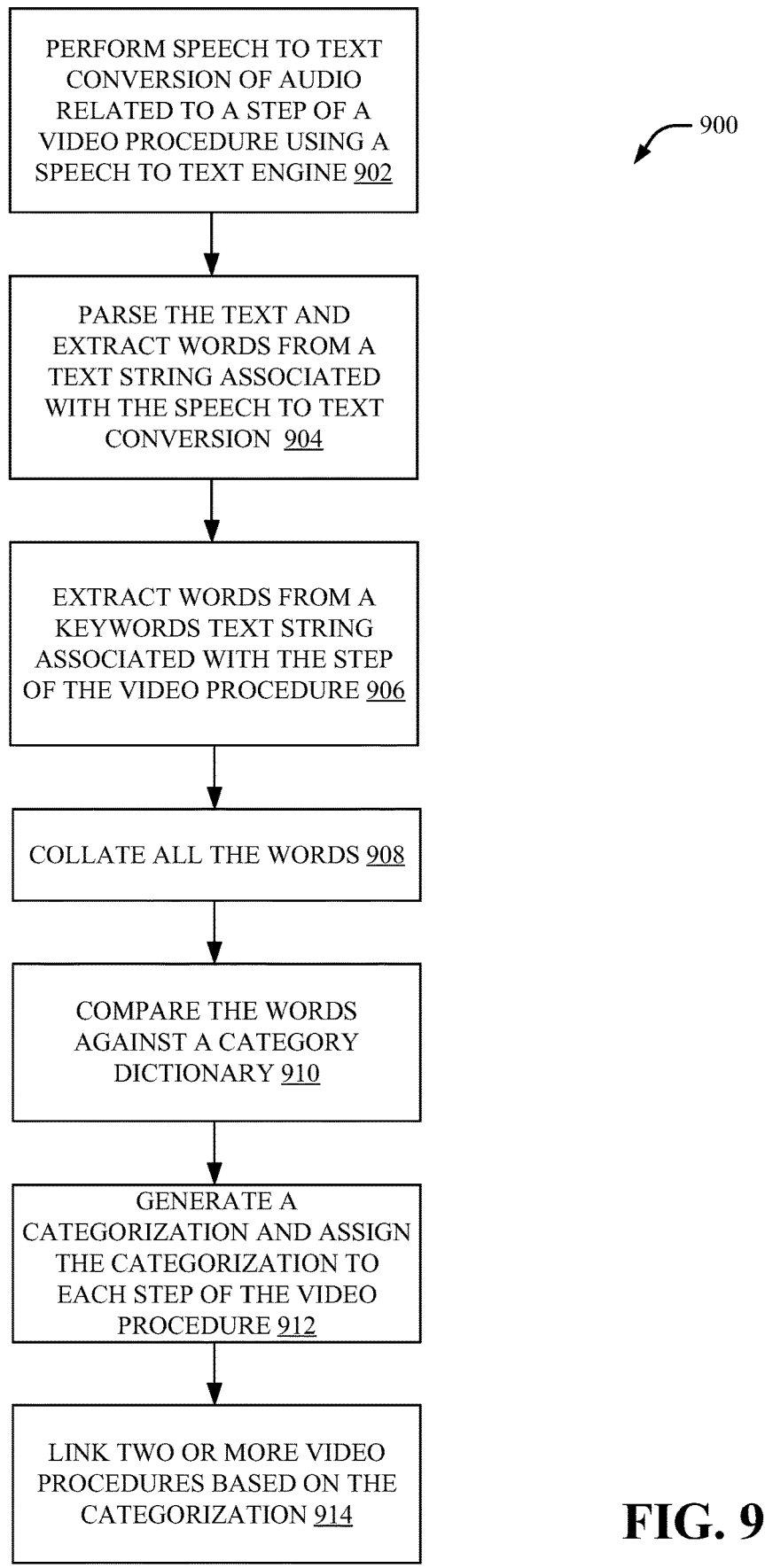
FIG. 9 illustrates another flow diagram for categorizing steps in a video procedure, in accordance with one or more embodiments described herein.

FIG. 9 illustrates a computer-implemented method 900 for categorizing steps in a video procedure, in accordance with one or more embodiments described herein. The computer-implemented method 900 is associated with the wearable device system 102, for example. In one or more embodiments, the computer-implemented method 900 begins at block 902 that performs (e.g., by the video procedure component 104) speech to text conversion of audio related to a step of a video procedure using a speech to text engine (block 902). The computer-implemented method 900 also includes a block 904 that parses (e.g., by the video procedure component 104) the text and extracts (e.g., by the video procedure component 104) words from a text string associated with the speech to text conversion. The computer-implemented method 900 also includes a block 906 that extracts (e.g., by the video procedure component 104) words from a keywords text string associated with the step of the video procedure. Furthermore, the computer-implemented method 900 includes a block 908 that collates (e.g., by the video procedure component 104) all the words. The computer-implemented method 900 also includes a block 910 that compares (e.g., by the video procedure component 104) the words against a category dictionary. The computer-implemented method 900 also includes a block 912 that generates a categorization (e.g., by the video procedure component 104) and assigns the categorization (e.g., by the video procedure component 104) to each step of the video procedure. Furthermore, the computer-implemented method 900 includes a block 914 that links (e.g., by the video procedure component 104) two or more video procedures based on the categorization.

Figure 10:
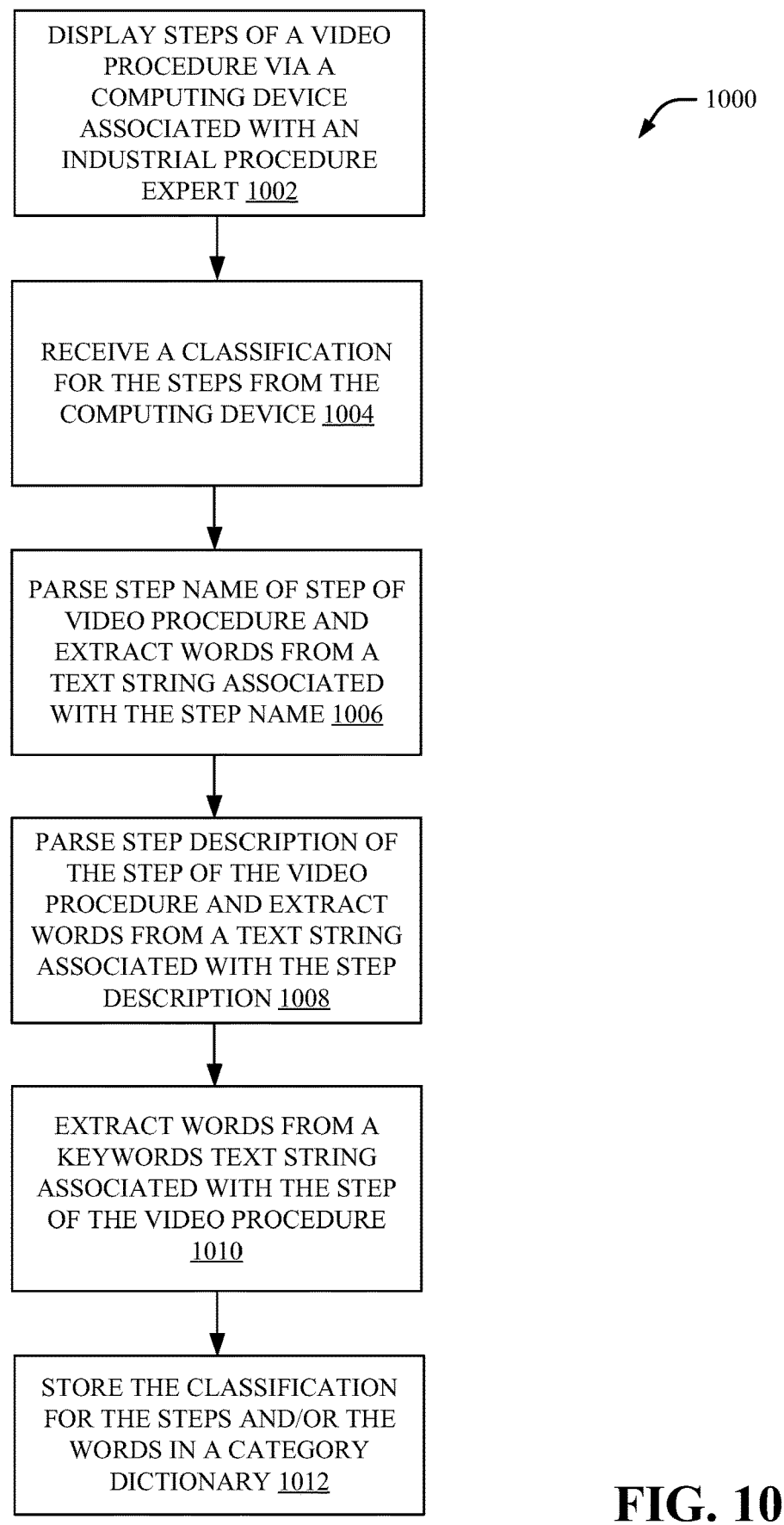
FIG. 10 illustrates yet another flow diagram for categorizing steps in a video procedure, in accordance with one or more embodiments described herein.

FIG. 10 illustrates a computer-implemented method 1000 for categorizing steps in a video procedure, in accordance with one or more embodiments described herein. The computer-implemented method 1000 is associated with the wearable device system 102, for example. In one or more embodiments, the computer-implemented method 1000 begins at block 1002 that displays (e.g., by the display component 108) steps of a video procedure via a computing device associated with an industrial procedure expert. The computer-implemented method 1000 also includes a block 1004 that receives (e.g., by the display component 108) a classification for the steps from the computing device. The computer-implemented method 1000 also includes a block 1006 that parses (e.g., by the video procedure component 104) a step name of a step of a video procedure and extracts (e.g., by the video procedure component 104) words from a text string associated with the step name. The computer-implemented method 1000 also includes a block 1008 that parses (e.g., by the video procedure component 104) a step description of the step of the video procedure and extracts (e.g., by the video procedure component 104) words from a text string associated with the step description. The computer-implemented method 1000 also includes a block 1010 that extracts (e.g., by the video procedure component 104) words from a keywords text string associated with the step of the video procedure. Furthermore, the computer-implemented method 1000 includes a block 1012 that stores (e.g., by the video procedure component 104) the classification for the steps and/or the words in a category dictionary.

Figure 11:
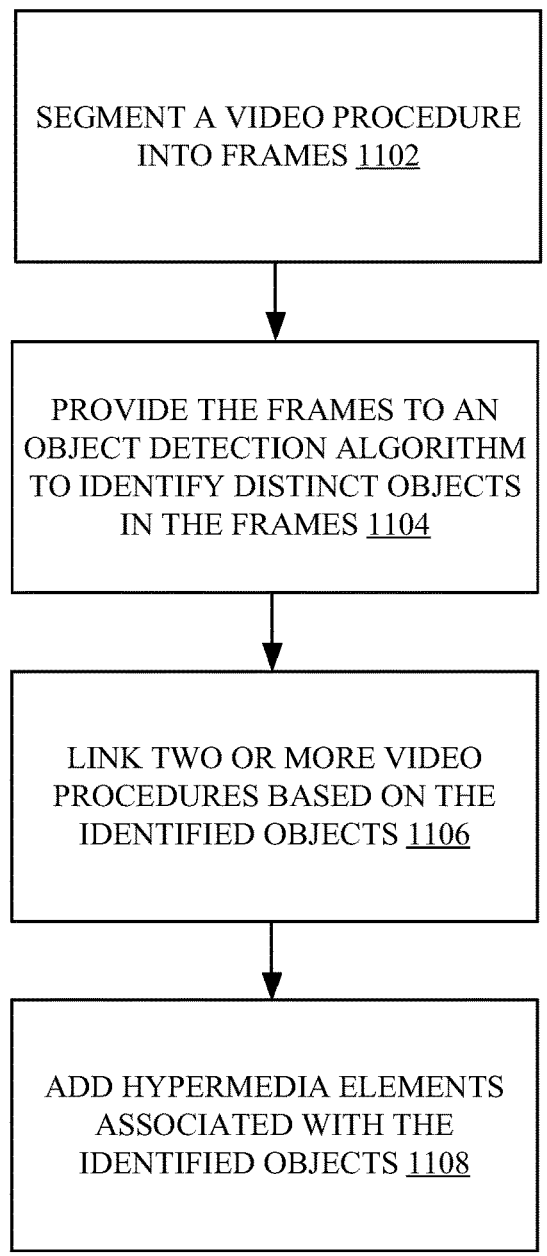
FIG. 11 illustrates a flow diagram for creating hypervideos, in accordance with one or more embodiments described herein.

FIG. 11 illustrates a computer-implemented method 1100 for creating hypervideos, in accordance with one or more embodiments described herein. The computer-implemented method 1100 is associated with the wearable device system 102, for example. In one or more embodiments, the computer-implemented method 1100 begins at block 1102 that segments (e.g., by the video procedure component 104) a video procedure into frames. The computer-implemented method 1100 also includes a block 1104 that provides (e.g., by the video procedure component 104) the frames to an object detection algorithm to identify distinct objects in the frames. The computer-implemented method 1100 also includes a block 1106 that links (e.g., by the hypermedia component 106) two or more video procedures based on the identified objects. Furthermore, the computer-implemented method 1100 includes a block 1108 that adds (e.g., by the hypermedia component 106) hypermedia elements associated with the identified objects.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

What is claimed is:
1. A system, comprising:
a processor; and
a memory that stores executable instructions that, when executed by the processor, cause the processor to:
identify a video procedure comprising at least a main video procedure, the video procedure corresponding to an industrial task comprising a plurality of sub-steps, the plurality of sub-steps comprising at least a first branch of sub-steps from a main set of steps and a second branch of sub-steps from the main set of steps, wherein the first branch of sub-steps includes at least one step that differs from the second branch of sub-steps;
compare media data related to a first sub-step of the plurality of sub-steps with a category dictionary to determine a category for the first sub-step of the video procedure, wherein the category dictionary comprises a mapping of keywords to a plurality of categories;
link, based on the category of the first sub-step of the video procedure, the first sub-step of the video procedure with at least a portion of a second video procedure to generate a hypervideo for the industrial task, wherein the hypervideo is a video stream that comprises one or more interactive hypermedia elements associated with the industrial task, wherein the hypervideo corresponds to a first branch from the main video procedure, wherein the first branch from the main video corresponds to the first branch of sub-steps, and wherein the video procedure comprises at least a second sub-step of the video procedure that represents a second branch from the main video procedure, wherein the second branch from the main video corresponds to the second branch of sub-steps;
display the hypervideo via a head-mounted visual display of a wearable device; and
display, via the head-mounted visual display of the wearable device, a second hypervideo simultaneously with the first hypervideo,
wherein interaction with the second hypervideo switches to the second branch from the main video procedure.
2. The system of claim 1, wherein the executable instructions cause the processor to:

generate first metadata for the video procedure based on the category for the first sub-step of the video procedure; and link the first sub-step of the video procedure with at least the portion of the second video procedure based on second metadata for the second video procedure.

3. The system of claim 1, wherein the executable instructions cause the processor to:

segment the video procedure to generate a segmented portion of the video procedure that is associated with the first sub-step of the video procedure; and determine the media data based on an object detection process associated with the segmented portion of the video procedure.

4. The system of claim 1, wherein the executable instructions cause the processor to:

link, based on the category for the first sub-step of the video procedure, the first sub-step of the video procedure with a document associated with the first sub-step for the industrial task; and display data related to the document as an interactive hypermedia element of the hypervideo via the head-mounted visual display of the wearable device.

5. The system of claim 1, wherein the executable instructions cause the processor to:

link, based on the category for the first sub-step of the video procedure, the first sub-step of the video procedure with an audio recording associated with the first sub-step for the industrial task; and present the audio recording as an interactive hypermedia element of the hypervideo via a speaker of the wearable device.

6. The system of claim 1, wherein the executable instructions cause the processor to:

link, based on the category for the first sub-step of the video procedure, the first sub-step of the video procedure with historical data associated with a work history for the first sub-step for the industrial task; and display the historical data as an interactive hypermedia element of the hypervideo via the head-mounted visual display of the wearable device.

7. The system of claim 1, wherein the executable instructions cause the processor to:

initiate, based on the category for the first sub-step of the video procedure, a video conference between the wearable device and a computing device associated with an on-demand expert.

8. The system of claim 1, wherein the media data comprises a step name, a step description, or at least one keyword associated with the first sub-step.

9. The system of claim 1, wherein the media data comprises audio data related to the first sub-step, wherein the audio data comprises at least one word mapped to the category in the category dictionary.

10. The system of claim 1, wherein the hypervideo comprises a first hypervideo, the system further caused to:

in response to detecting a context change, display, via the head-mounted visual display of the wearable device, a second hypervideo in place of the first hypervideo, the second hypervideo corresponding to the second branch from the main video procedure.

11. A computer-implemented method, comprising:

identifying a video procedure comprising at least a main video procedure, the video procedure corresponding to an industrial task comprising a plurality of sub-steps, the plurality of sub-steps comprising at least a first branch of sub-steps from a main set of steps and a second branch of sub-steps from the main set of steps, wherein the first branch of sub-steps includes at least one step that differs from the second branch of sub-steps;

comparing, by a device comprising a processor, media data related to a first sub-step of the plurality of sub-steps with a category dictionary to determine a category for the first sub-step of the video procedure, wherein the category dictionary comprises a mapping of keywords to a plurality of categories;

linking, by the device and based on the category for the first sub-step of the video procedure, the first sub-step of the video procedure with at least a portion of a second video procedure to generate a hypervideo, wherein the hypervideo is a video stream that comprises one or more interactive hypermedia elements associated with the industrial task, wherein the hypervideo corresponds to a first branch from the main video procedure, wherein the first branch from the main video corresponds to the first branch of sub-steps, and wherein the video procedure comprises at least a second sub-step of the video procedure that represents a second branch from the main video procedure, wherein the second branch from the main video corresponds to the second branch of sub-steps;

displaying, by the device the hypervideo via a head-mounted visual display of a wearable device; and displaying, via the head-mounted visual display of the wearable device, a second hypervideo simultaneously with the first hypervideo, wherein interaction with the second hypervideo switches to the second branch from the main video procedure.

12. The computer-implemented method of claim 11, further comprising:

generating, by the device, first metadata for the video procedure based on the category for the first sub-step of the video procedure, wherein the linking comprises linking the first sub-step of the video procedure with at least the portion of the second video procedure based on second metadata for the second video procedure.

13. The computer-implemented method of claim 11, further comprising:

segmenting, by the device, the video procedure to generate a segmented portion of the video procedure that is associated with the first sub-step of the video procedure; and determining, by the device, the media data based on an object detection process associated with the segmented portion of the video procedure.

14. The computer-implemented method of claim 11, further comprising:

linking, by the device and based on the category for the first sub-step of the video procedure, the first sub-step of the video procedure with a document associated with the first sub-step for the industrial task; and displaying, by the device, data related to the document as an interactive hypermedia element of the hypervideo via the head-mounted visual display of the wearable device.

15. The computer-implemented method of claim 11, further comprising:

linking, by the device and based on the category for the first sub-step of the video procedure, the first sub-step of the video procedure with an audio recording associated with the first sub-step for the industrial task; and presenting, by the device, the audio recording as an interactive hypermedia element of the hypervideo via a speaker of the wearable device.

16. The computer-implemented method of claim 11, further comprising:
    linking, by the device and based on the category for the first sub-step of the video procedure, the first sub-step of the video procedure with historical data associated with a work history for the first sub-step for the industrial task; and
    displaying, by the device, the historical data as an interactive hypermedia element of the hypervideo via the head-mounted visual display of the wearable device.

17. The computer-implemented method of claim 11, further comprising:
    initiating, by the device and based on the category for the first sub-step of the video procedure, a video conference between the wearable device and a computing device associated with an on-demand expert.

18. A computer program product comprising at least one non-transitory computer-readable storage medium having program instructions embodied thereon, the program instructions executable by a processor to cause the processor to:
    identify a video procedure comprising at least a main video procedure, the video procedure corresponding to an industrial task comprising a plurality of sub-steps, the plurality of sub-steps comprising at least a first branch of sub-steps from a main set of steps and a second branch of sub-steps from the main set of steps, wherein the first branch of sub-steps includes at least one step that differs from the second branch of sub-steps;
    compare media data related to a first sub-step of the plurality of sub-steps with a category dictionary to determine a category for the first sub-step of the video procedure, wherein the category dictionary comprises a mapping of keywords to a plurality of categories;
    link, based on the category for the first sub-step of the video procedure, the first sub-step of the video procedure with at least a portion of a second video procedure to generate a hypervideo for the industrial task, wherein the hypervideo is a video stream that comprises one or more interactive hypermedia elements associated with the industrial task, wherein the hypervideo corresponds to a first branch from the main video procedure, wherein the first branch from the main video corresponds to the first branch of sub-steps, and wherein the video procedure comprises at least a second sub-step of the video procedure that represents a second branch from the main video procedure, wherein the second branch from the main video corresponds to the second branch of sub-steps;
    display the hypervideo via a head-mounted visual display of a wearable device; and
    display, via the head-mounted visual display of the wearable device, a second hypervideo simultaneously with the first hypervideo,
    wherein interaction with the second hypervideo switches to the second branch from the main video procedure.

19. The computer program product of claim 18, wherein the program instructions are executable by the processor to cause the processor to:
    generate first metadata for the video procedure based on the category for the first sub-step of the video procedure; and
    link the first sub-step of the video procedure with at least the portion of the second video procedure based on second metadata for the second video procedure.

* * * * *